Patented Mar. 16, 1926.

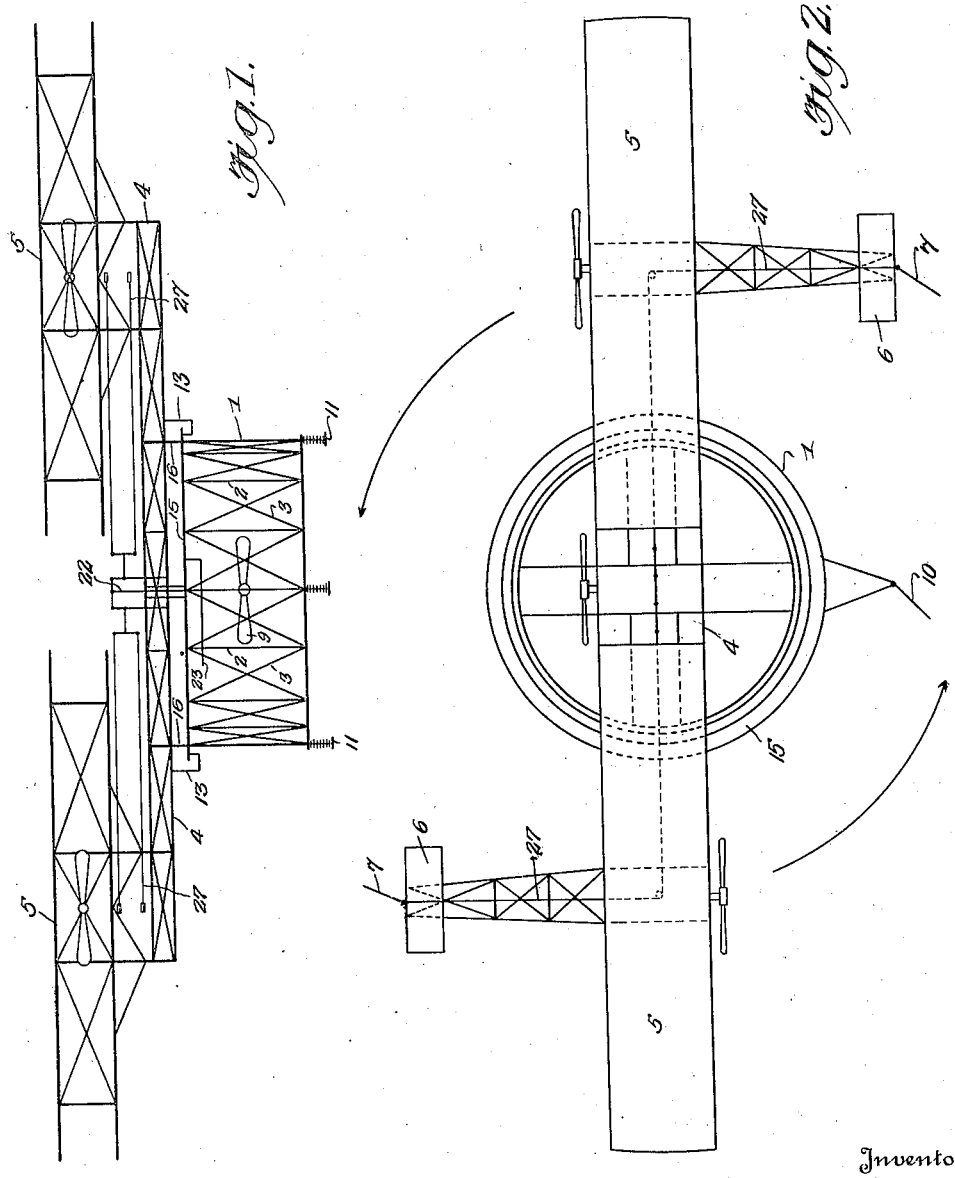

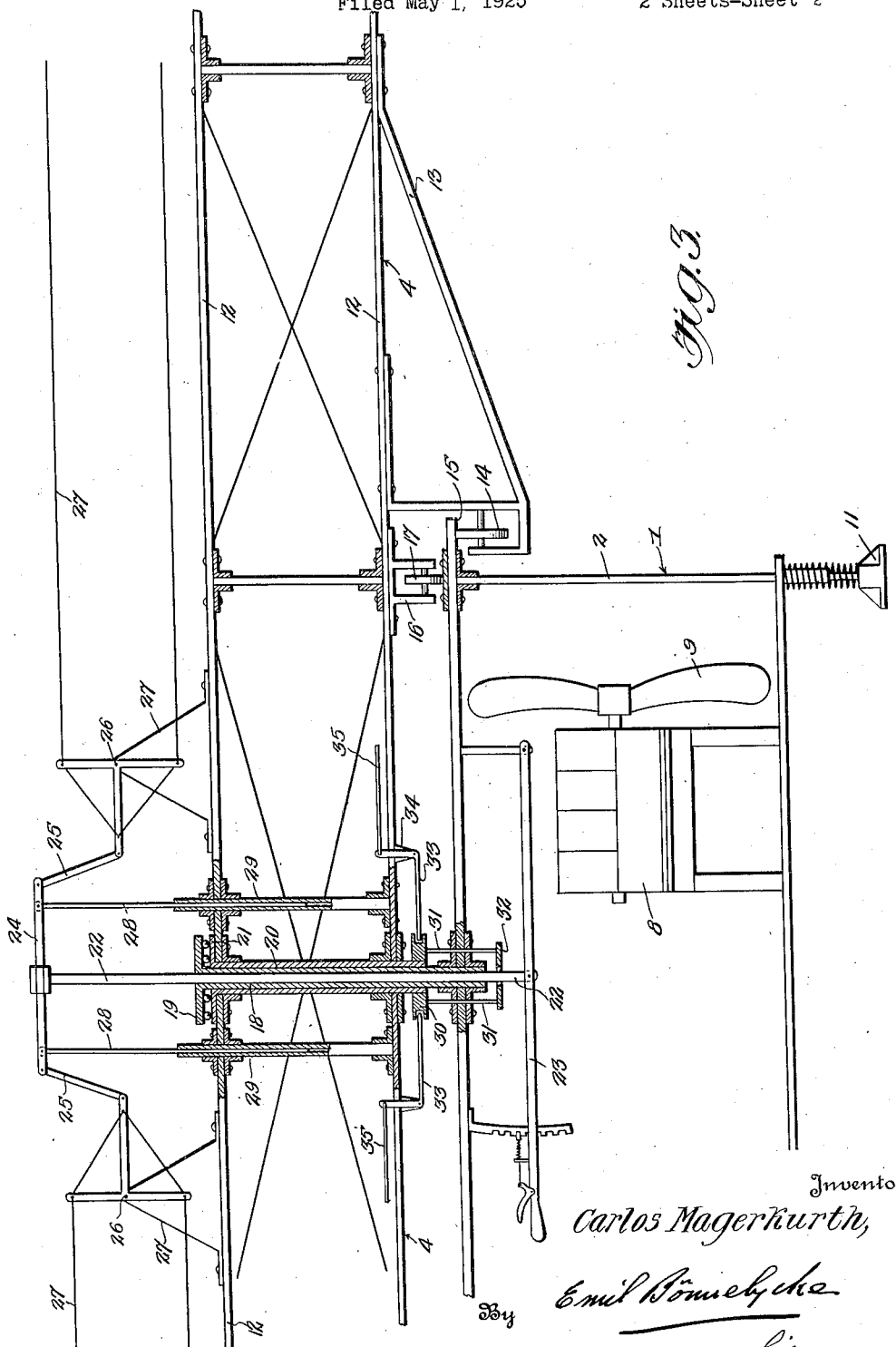

1,577,334

UNITED STATES PATENT OFFICE.

CARLOS MAGERKURTH, OF LIMA, PERU.

HELICOPTER.

Application filed May 1, 1925. Serial No. 27,196.

*To all whom it may concern:*

Be it known that I, CARLOS MAGERKURTH, a citizen of the Republic of Peru, residing at Calle Mantas 158, Lima, Peru, have invented certain new and useful Improvements in Helicopters, of which the following is a specification.

My invention relates to aircraft of the heavier than air type, and relates more particularly to helicopters adapted for horizontal travel as well as vertical ascent and descent. It is my purpose to provide a helicopter of light, strong and simple construction, which may be easily controlled and may lift and carry considerable weights.

My invention resides in a helicopter having lifting wings at least some of which are self-propelled and of which each preferably comprises a complete airplane secured to a rotary beam or frame, of skeleton construction, which beam supports and rotates about a base, adapted to provide space for cargo, passengers, etc. Provision is made for controlling the motors of the airplanes constituting the helicopter wings, as well as the ailerons which control ascent and descent. A motor-driven propeller may be mounted on the base so that when the helicopter is in the air, the propeller on the base, being mounted on a horizontal shaft, will provide for horizontal travel. To descend, the motor in the base is stopped, and the speed of the airplane motors is diminished, to diminish the sustaining effect. Alternatively, these motors may run at constant speed, and descent can be effected by changing the angle at which the ailerons are set.

The invention is illustrated in the accompanying drawings, in which:

Figure 1 is a diagrammatic rear elevation of the helicopter.

Fig. 2 is a diagrammatic top plane view.

Fig. 3 is a transverse section through part of the base or frame and the superposed beam to whose ends the lifting planes are secured.

A frame 1 which is preferably of skeleton construction comprising struts 2 and guy wires 3 has a skeleton frame or beam 4 mounted over it for rotation. Airplanes 5 are secured to the ends of the beam. As shown, these airplanes are biplanes, but it is to be understood that planes comprising any desired number of wings may be used. The planes preferably have their frames and fuselage of skeleton construction. As many planes may be provided as desired; for example, with three planes the frame 4 will be of triangular form, while with four planes, the beam will have the form of a cross. The air planes are preferably so attached to the beam that they may have a slight forward and backward tilting movement. The ailerons of the airplanes are indicated at 6, and the planes are preferably provided with rudders 7 adapted to be fixed in position. An engine 8 is mounted in the base, and its shaft is provided with a propeller 9. A rudder 10 is provided on the base to render possible steering while flying horizontally. The base is provided with landing shoes 11 which are preferably connected to the base by springs.

As shown, the beam comprises spaced rods 12, for instance of metal tubing or metal of angular cross-section, braced with guy wires. Secured to the under side of the beam are two depending brackets 13, in which wheels 14 are journaled, preferably on ball bearings. These wheels engage the lower side of a track 15 secured to the base. When the machine is in the air, the base is supported on the wheels 14. Means may be provided to counteract any tendency of the base to travel with the beam. For example, the base may be provided with rudders (not shown) extending radially outward and mounted on horizontal shafts, so as to be influenced by the down draft created by the rotating airplanes on the ends of the beam.

The beam is also provided with depending brackets 16 in which wheels 17 are journaled. These wheels run on a track provided on the base, and support the beam and planes when the machine is at rest. They also reduce friction in the commencement of the rotation of the beam.

A sleeve 18 is secured to the base, and extends through the beam terminating in a ball race 19. A sleeve 20 is secured to the beam and at its upper end it is provided with a ball race 21, balls being interposed between the two races. In this way the base is centered, the sleeve 18 forming a shaft about which the beam rotates.

A rod 22 extends through the sleeve 18, and at its lower end is pivoted to a lever 23 whereby the rod is moved axially and locked in any desired position. A cross member 24 is secured to the top of the rod in such manner that it will move with the rod in its axial reciprocations, but may rotate around it with the beam. Each end of the cross member is connected by a link 25 with one arm of a three-armed lever pivoted at 26 to a support 27 secured to the beam. The other two arms of each of the three-armed levers are connected to cables 27, extending to the ailerons of the airplanes, whereby the angularity of the ailerons may be adjusted. As shown in Figs 1 and 2, these cables pass over wheels and then extend rearwardly of the airplanes. The cross member 24 is steadied in its vertical movements by means of rods 28 guided in tubes 29 secured to the beam. It will be understood of course that ball bearings or other anti-friction bearings may be provided between the cross member and the upper end of the rod 22.

Around the lower end of the rotating sleeve 24 I provide a peripherally grooved collar 30, which is adapted to be moved axially of the sleeve but not to rotate. Rods 31 are secured to the collar, and pass through the upper part of the base, having their lower ends received in an apertured plate 32 surrounding the rod 22. Two bell cranks 33 are pivoted on brackets 34 secured to the beam, and the inwardly directed ends of the bell cranks extend into the peripheral groove in the collar 30. These ends may be provided with anti-friction rollers if desired. The other ends of the bell cranks are pivoted to reciprocable rods 35 extending outwardly of the beam and guided thereby. These rods terminate beneath the airplanes at the ends of the beam, at which point they are attached to any suitable connecting elements, not shown, extending to the carbureters of the airplane motors, whereby to control the speed of the latter. Alternatively, the rods 35 may be connected to engine starting mechanism provided for the airplane engines and to the ignition switches, in which case outward movement of the rods could be used to start the engines, and inward movement to stop them, said engines being set to run at a predetermined speed. In this event, the speed of ascent and descent of the helicopter will be determined by the angularity of the ailerons, controlled from the handle 23. Any suitable mechanism, not shown, may be used for raising and lowering the plate 32 and sleeve 30.

I claim as my invention:

1. A helicopter comprising a base, a rotary beam thereover, a circular track on the base, symmetrically arranged brackets on the beam, anti-friction members carried by the brackets and engaging the track to raise the base, a centering element secured to the base centrally of the track and passing through the beam, a self-propelled airplane at each end of the beam, horizontal rudders on said airplanes and means to control the angularity of said rudders passing through said centering element.

2. A helicopter in accordance with claim 1, including depending brackets on the beam, a circular, upwardly facing track on the base and anti-friction members carried in said depending brackets and resting on said track to support the beam when it is not lifting the base.

3. A helicopter in accordance with claim 1, in which the means for controlling the pitch of the horizontal rudders comprises a manually adjustable lever in the base, a rod pivoted thereto and extending upwardly through a sleeve centrally secured to the base and arising therefrom, levers fulcrumed on the beam and connected to the top of the rod, and cables secured to the second mentioned levers and to the horizontal rudders.

4. A helicopter in accordance with claim 1, having a sleeve secured to the beam and surrounding the centering element, a vertically adjustable, peripherally grooved member guided by said sleeve and adapted to be raised and lowered by the pilot in the base, bell cranks pivoted to the beam, one end of each crank extending into the groove and the other end of each crank being pivoted to a connection adapted to control the running of the airplane.

5. A helicopter in accordance with claim 1, having an engine-driven propeller in the base, for horizontal travel.

6. A helicopter comprising a base, an element to rotate about said base as a center and connected therewith so as to raise it, a number of self-propelled airplanes secured to said element, horizontal rudders on said airplanes and a centering member secured to the base and passing through said element, and means to control said rudders movable through said centering member.

7. A helicopter comprising a base, an element to rotate about said base as a center and connected therewith so as to raise it, a number of airplanes secured to said element, at least some of which are self-propelled, horizontal rudders on said airplanes, a centering member secured to the base and passing through said element, and means to control said rudders movable through said centering member.

In testimony whereof I affix my signature.

CARLOS MAGERKURTH.